Feb. 7, 1950     G. MACKAS     2,496,298
SHOCK TESTING APPARATUS
Filed Feb. 5, 1946     2 Sheets—Sheet 1

INVENTOR.
GEORGE MACKAS
BY William P. Hall
ATTORNEY

Feb. 7, 1950
G. MACKAS
2,496,298
SHOCK TESTING APPARATUS
Filed Feb. 5, 1946
2 Sheets-Sheet 2
FIG. 3
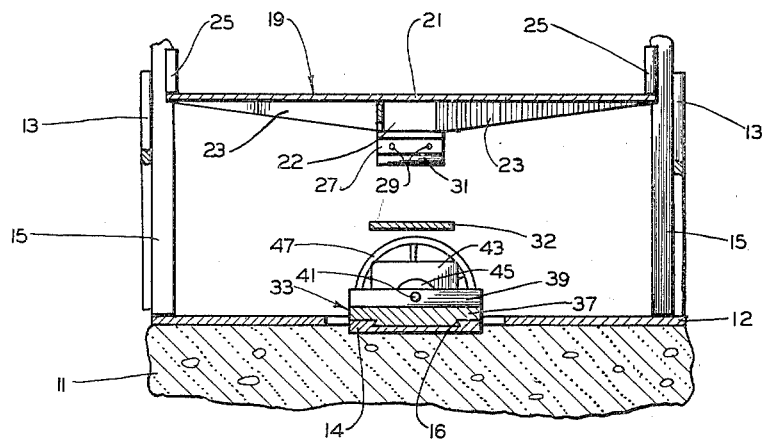
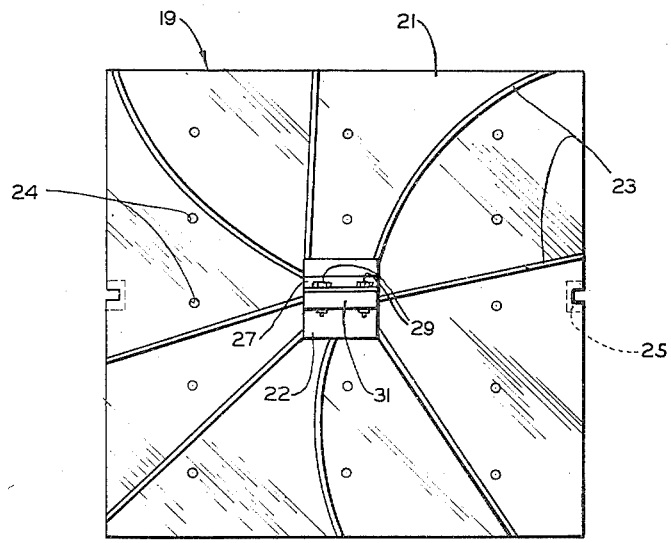
FIG. 4
INVENTOR.
GEORGE MACKAS
BY
William D. Hall.
ATTORNEY Patented Feb. 7, 1950

2,496,298

UNITED STATES PATENT OFFICE 2,496,298

SHOCK TESTING APPARATUS

George Mackas, Brooklyn, N. Y., assignor to the United States of America as represented by the Secretary of War Application February 5, 1946, Serial No. 645,671

8 Claims. (Cl. 73—12)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to testing apparatus, and more particularly to apparatus for shock or bump testing.

Various means have been developed to test certain types of equipment (such as sensitive electronic devices) to determine what shocks they are able to sustain without damage. In making such tests it is advantageous to be able to submit the equipment under test to shocks of various intensities and characteristics, and to be able to do this under completely controlled conditions.

It is therefore an object of the present invention to provide testing apparatus whereby shocks of various predetermined characteristics can be imparted to equipment which is being subjected to tests.

It is a further object to provide means in such apparatus for accurately controlling the shock characteristics.

It is another object to provide apparatus adapted to produce shocks of predetermined accelerations and at predetermined frequencies of vibration.

It is a further object to provide such apparatus which is rugged and has relatively few parts and is simple in operation.

These and other objects and advantages of my present invention, which will be better understood as the detailed description thereof progresses, are obtained in the following manner:

I provide a test table to which equipment to be tested is fastened. Said table may be raised and dropped an adjustable, predeterminable vertical distance and, at the end of said drop, sustains a shock of adjustable, predeterminable characteristics. At the end of its drop, the said table strikes a flat cantilever spring. The said spring is mounted so as to be movable longitudinally to different positions whereby the table may strike it at different points along its length, thus changing the effective length of spring and therefore its spring constant.

When the test table falls and strikes the spring, the said spring decelerates the table, reverses its motion and accelerates it upward. The spring motion is a simple harmonic and the maximum deceleration (which will be referred to as "acceleration") occurs when the table reverses its downward motion. This acceleration may be described in terms of gravity ($g$) units. The time in which the maximum acceleration is attained after the table first strikes the spring is one-half the total time that the table is in physical contact with the spring after its fall. The time between initial contact between the table and the spring and the maximum acceleration constitutes one-quarter of a simple harmonic wave cycle. The frequency of this wave cycle in cycles per second may be used to conveniently describe the time in which the maximum acceleration is attained.

Thus, the shocks developed by testing apparatus employing the invention disclosed herein may be described in terms of maximum accelerations in $g$ units and in terms of the time in which such maximum accelerations were attained as indicated by vibration frequency in cycles per second. In the apparatus disclosed herein, the acceleration and frequency of vibration of a shock are controlled by varying two factors, one, the height of the vertical drop of the table (which varies only the acceleration) and, two, the effective length of the spring (which varies both the acceleration and the frequency).

The table may be raised and dropped in any suitable manner, either manually or mechanically, and the effective length of the spring may also be varied in any suitable manner. Also, obviously, means may be provided for repeating the shocking operation so as to subject the equipment under test to a series of shocks and, if desired, the shock characteristics may be varied at the same time in any predetermined manner.

In the accompanying specification there is described, and in the annexed drawing shown, what is considered a preferred embodiment of the present invention. It is however to be understood that my invention is not limited to said embodiment inasmuch as changes therein may be made without the exercise of invention and within the true spirit and scope of the claims hereto appended.

In the drawings:

Figure 3 is an enlarged fragmentary vertical sectional view, taken along the line 3—3 of Figure 2; and Figure 4 is a bottom view of the test table.

Figure 1:
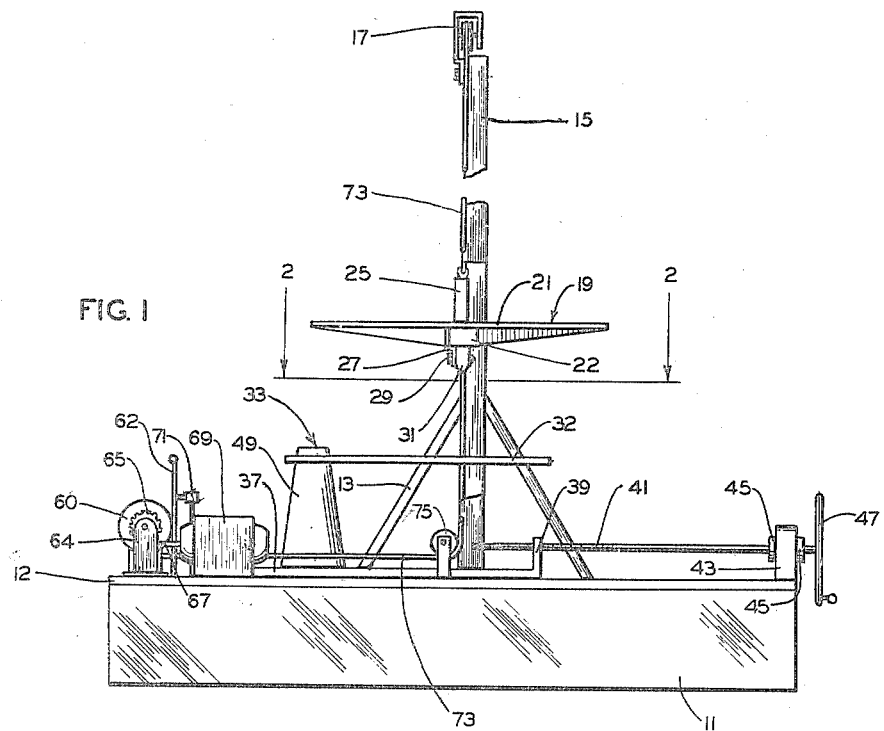
Figure 1 is an elevational view of a testing device embodying the present invention, some parts being broken away for clarity and the device being shown as the test table is being raised.
Figure 2:
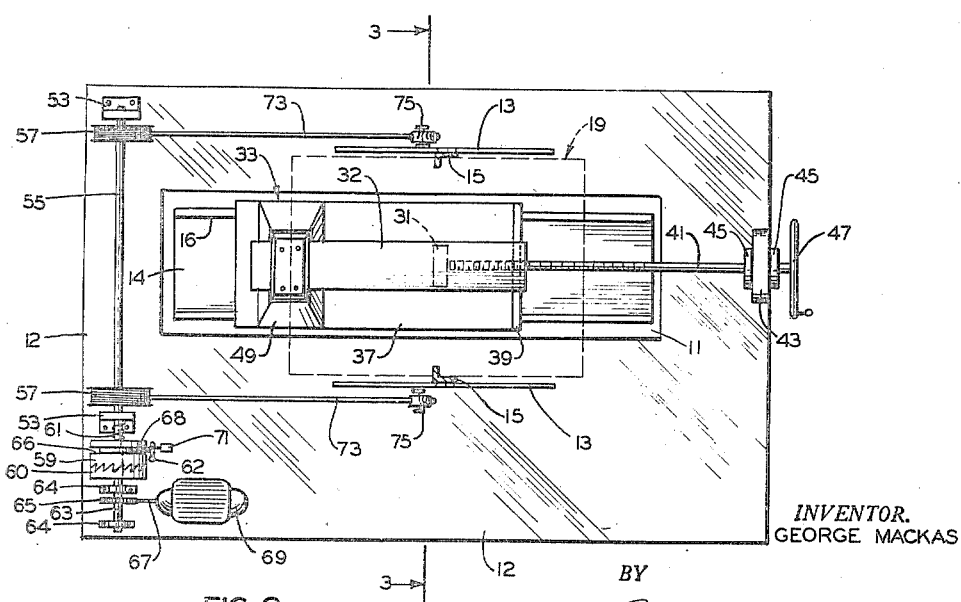
Figure 2 is a horizontal sectional view, taken along the line 2—2 of Figure 1, the relative positions of the test table and strike being shown in phantom.

Referring now more particularly to the drawings, the illustrated testing device is supported upon a suitable heavy foundation 11 (preferably concrete) which will not be adversely effected by the constant shocks resulting from its operation. Secured directly to said foundation 11 are a flat metal, frame-like base 12 and also, within the opening in said base 12 and out of contact therewith, a track 14, provided with a wide undercut longitudinal groove 16. Supported upon said base 12, by means of several brackets 13, are two vertically disposed guides 15, made up of angle metal. A pulley 17 is secured to the upper end of each of said guides 15.

Positioned so as to be free to slide vertically along the guides 15 is a test table 19, preferably of steel. Said test table 19 includes a horizontally disposed, flat plate 21 and a solid metal block 22 extending downwardly from the center thereof. The plate 21 is pierced by a plurality of holes 24 to facilitate the fastening thereto of equipment to be tested. A plurality of reinforcing webs 23 also extend downwardly from the lower surface of said plate 21. Said webs 23 are generally radially disposed about the block 22 but are preferably of various configurations (see Figure 4) so that the areas of the upper plate 21, delimited thereby, are asymmetrical. The midpoints of two opposite edges of said plate 21 are notched so as to slidably receive the guides 15, and similarly channelled vertically disposed slide members 25 are secured to the upper surface of the table 19 above said notches.

A vertically disposed strike 31 is fastened to the lower surface of the block 22 by means of strike bracket 27 and bolts 29. Said strike 31 is preferably a rectangular piece of hardened flat steel which is rounded along its lower edge, which strikes a cantilever spring 32, as will hereinafter appear.

A spring stand 33 is sustained upon the track 14 and is slidable along the groove 16. Said spring stand 33 includes a fairly heavy metal base 37 which has an upturned portion 39 at one end. Such upturned portion 39 is pierced by a horizontally disposed threaded hole receivable to a threaded shaft 41. The threaded shaft 41 also passes through a bearing in a vertically disposed flange 43 which is attached to the base 12 and said shaft 41 is provided with a pair of collars 45, disposed on opposite sides of said flange 43, so as to prevent longitudinal movement of said shaft. The outer end of the shaft 41 terminates in a handwheel 47. Sustained upon one end of the base 37 is an upwardly extending spring pedestal 49 upon which is mounted one end of a flat, elongated, horizontally disposed, cantilever spring 32.

Also sustained upon the frame-like base 12, by means of two bearing brackets 53, is a horizontally disposed rotatable axle 55. A pair of reels 57 are secured to said axle 55 for rotation therewith. One clutch element 59 of a conventional one-way drum-type clutch is mounted upon one end of the axle 55, for rotation therewith. Said clutch element 59 is free to slide a limited distance longitudinally along said axle 55, but is normally maintained in an extended position by a coil spring 61 encircling the said axle 55. Said clutch element 59 is retractable against the pressure of the spring 61 by means of a clutch lever 62 which is pivotably secured to the base 12. The clutch lever 62 is provided with a horizontally disposed pin 68 which extends into a circumferential groove 66 in the clutch element 59.

A companion clutch element 60 is secured to one end of a short shaft 63, which is sustained upon the base 12 by two bearing brackets 64 and is provided also with a worm wheel 65. Said worm wheel 65 is in mesh with a worm 67 which is operated by an electric motor 69. A start-stop switch 71 for the motor 69 is so positioned that each time the clutch lever 62 is operated to retract the clutch element, the said switch 71 is opened to stop the operation of said motor 69.

A pair of lifting cables 73 are attached to the upper ends of the slide members 25, respectively, and extend over the pulleys 17 and then, by way of suitable direction changing pulleys 75, to the reels 57, respectively.

In the operation of the testing device described above, equipment to be tested is mounted upon the test table 19 with fastenings through the holes 24. The electric motor 69 is then started, by manual manipulation of the switch 71, whereupon, by way of the worm 67, the worm wheel 65, the clutch elements 59, 60 (which are normally in mesh) and the axle 55, the reels 57 are caused to rotate. Such rotation winds up the cables 73 about said reels 57 and pulls the test table 19 upwardly. When it has reached a desired height, the clutch lever 62 is swung to disengage the clutch elements 59, 60 and make the reels 57 freely rotatable. The test table 19 thereupon drops until the strike 31 impinges against the cantilever spring 32 thereby causing a sudden deceleration and imparting a shock or bump to the equipment being tested.

The acceleration and frequency of vibration of the shock may be varied by varying the height to which the table 19 is raised and by rotating the handwheel 47 which causes the spring stand 33 and the cantilever spring 32, sustained thereon, to move horizontally thereby adjusting the point of said spring at which the strike 31 will hit it. By the latter adjustment the effective length of the said cantilever spring 32 (that is the distance between the spring pedestal 49 and the point on the spring where it is struck by the strike 31) is varied.

It will be understood that the test table 19 may be raised and dropped in any one of a number of suitable ways. Also the apparatus may be so arranged that the table will be raised and dropped automatically without the necessity of manipulating a clutch lever or other manual mechanism. Although not shown, a switching means to cut the motor 69 when the table 19 reaches a maximum operating height should be incorporated in the device.

What is claimed is:

1. A shock testing device comprising a test table, a substantially horizontally disposed elongated spring, a spring pedestal sustaining said spring at only one end thereof, means to translate the spring pedestal and spring horizontally relative to said table and means to cause the said table to strike against the said spring.

2. In an adjustable shock testing device, a horizontally disposed test table, means to drop said table a predetermined distance, a strike secured to said table, a cantilever spring sustained only at one end disposed below said strike so as to stop the downward movement of said table, and means to translate the spring relative to the strike so as to vary the effective length of said spring.

3. In a shock testing device, a test table, a downwardly extending strike secured to said table, an elongated spring positioned below said strike and sustained only at one end, means to adjust the position of said spring relative to said strike so that said spring may be struck by the strike at a plurality of predetermined points along the length of said spring so as to adjust its effective length for a predetermined shock and means to raise and drop the said test table.

4. In a shock testing device, a test table, a downwardly extending strike secured to said table, an elongated spring positioned below said strike and sustained only at one end, means to adjust the position of said spring relative to said strike so that said spring may be struck by the strike at a plurality of predetermined points along the length of said spring so as to adjust its effective length for a predetermined shock, means to raise and drop the said test table including a cable and a rotatable drum, and means to rotate said drum to raise the table and to release said drum to drop the table.

5. In testing apparatus, a foundation, a pair of upwardly extending guides sustained by said foundation, a test table slidably sustained upon said guides, a strike secured to said test table, means adapted to raise the test table and drop it, a cantilever spring sustained only at one end by the foundation and adjustable relative to the strike so that its effective length when struck by the strike may be varied.

6. A shock testing device comprising a foundation, a track on said foundation, a base slidable along said track, a spring pedestal sustained upon said base, an elongated cantilever spring sustained at only one end by said pedestal and means to slide the base along the track, a test table sustained above said foundation, and means to drop said test table upon said spring.

7. In a shock testing device as set forth in claim 3, wherein the means to raise and drop the test table are adjustable so that it can be dropped from any one of a plurality of different heights above said spring.

8. In a testing apparatus as set forth in claim 5, wherein the means to raise and drop the test table are adjustable so that it can be dropped from any one of a plurality of different heights above the spring.

GEORGE MACKAS.

REFERENCES CITED

The following references are of record in the file of this patent:

UNITED STATES PATENTS

| Number | Name | Date |
| --- | --- | --- |
| 1,604,089 | Topfl | Oct. 19, 1926 |
| 2,115,841 | Case | May 3, 1938 |
| 2,285,166 | Malhiot | June 2, 1942 |
| 2,301,967 | Nosker et al. | Nov. 17, 1942 |
| 2,412,860 | Baudry et al. | Dec. 17, 1946 |